(12) United States Patent
Lauwers et al.

(10) Patent No.: US 12,379,234 B2
(45) Date of Patent: Aug. 5, 2025

(54) OPTICAL DEVICE FOR DETECTING AN ACOUSTIC WAVE

(71) Applicants: COMMISSARIAT A L'ENERGIE ATOMIQUE ET AUX ENERGIES ALTERNATIVES, Paris (FR); UNIVERSITE GRENOBLE ALPES, Saint Martin D 'Heres (FR); C.N.R.S., Paris (FR); INSTITUT POLYTECHNIQUE DE GRENOBLE, Grenoble (FR)

(72) Inventors: Thomas Lauwers, Grenoble (FR); Skandar Basrour, Grenoble (FR); Jean-Guillaume Coutard, Grenoble (FR); Alain Gliere, Grenoble (FR); Guillaume Laffont, Grenoble (FR)

(73) Assignees: COMMISSARIAT A L'ENERGIE ATOMIQUE ET AUX ENERGIES ALTERNATIVES, Paris (FR); UNIVERSITE GRENOBLE ALPES, Saint Martin D 'Heres (FR); C.N.R.S., Paris (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 440 days.

(21) Appl. No.: 17/789,073

(22) PCT Filed: Dec. 24, 2020

(86) PCT No.: PCT/EP2020/087869
§ 371 (c)(1),
(2) Date: Jun. 24, 2022

(87) PCT Pub. No.: WO2021/130367
PCT Pub. Date: Jul. 1, 2021

(65) Prior Publication Data
US 2023/0037289 A1 Feb. 9, 2023

(30) Foreign Application Priority Data

Dec. 27, 2019 (FR) .................................. 19 15695

(51) Int. Cl.
*G01D 5/353* (2006.01)
*G02B 6/42* (2006.01)

(52) U.S. Cl.
CPC ..... *G01D 5/35312* (2013.01); *G01D 5/35316* (2013.01); *G02B 6/42* (2013.01)

(58) Field of Classification Search
CPC .......... G01D 5/35312; G01D 5/35316; G01H 9/006; G02B 6/42; G02B 6/122
See application file for complete search history.

(56) References Cited

U.S. PATENT DOCUMENTS

2009/0180730 A1 7/2009 Foster et al.
2010/0154620 A1 6/2010 Loock et al.
(Continued)

FOREIGN PATENT DOCUMENTS

EP  2 856 098 A2  4/2015
JP  2004-198116 A  7/2004

OTHER PUBLICATIONS

International Search Report issued Apr. 9, 2021 in PCT/EP2020/087869, filed on Dec. 24, 2020, 2 pages.
(Continued)

*Primary Examiner* — Michael P Mooney
(74) *Attorney, Agent, or Firm* — Oblon, McClelland, Maier & Neustadt, L.L.P.

(57) ABSTRACT

The invention relates to a device and method for detecting an acoustic wave propagating toward a membrane, the membrane carrying a waveguide comprising an optical cavity defining a resonant frequency. Under the effect of a vibration of the membrane, the resonance frequency of the optical cavity varies. The device includes a light source for
(Continued)

directing a light wave into the optical cavity, and a servo circuit for servo-controlling the wavelength of the light wave to the resonant wavelength of the optical cavity. Monitoring the variation in the wavelength of the light wave allows an amplitude of the acoustic wave to be estimated.

8 Claims, 8 Drawing Sheets

(56) References Cited

U.S. PATENT DOCUMENTS

| | | | |
|---|---|---|---|
| 2013/0317372 A1* | 11/2013 | Eberle | A61B 5/6851 600/478 |
| 2015/0100253 A1* | 4/2015 | Austerlitz | G01F 22/00 702/55 |
| 2015/0141843 A1 | 5/2015 | Eberle et al. | |
| 2018/0087956 A1 | 3/2018 | Jung et al. | |
| 2020/0093384 A1 | 3/2020 | Eberle et al. | |
| 2020/0173843 A1* | 6/2020 | Westerveld | G02B 6/122 |

OTHER PUBLICATIONS

Written Opinion issued Apr. 9, 2021 in PCT/EP2020/087869, filed on Dec. 24, 2020, 9 pages (with English Translation of Categories of Cited Documents).

* cited by examiner

OPTICAL DEVICE FOR DETECTING AN ACOUSTIC WAVE

TECHNICAL FIELD

The technical field of the invention is detection of an acoustic wave using a resonant optical cavity.

PRIOR ART

Acoustic waves are usually detected by devices based on MEMS or NEMS electromechanical resonators (MEMS being the acronym of micro-electro mechanical systems and NEMS being the acronym of nano-electro mechanical systems). This type of transducer may be manufactured using wafer-level microfabrication processes. A moderate manufacturing cost is achieved as a result, making such transducers particularly suitable for use in everyday components. These resonators are based on a membrane that vibrates under the effect of exposure to an acoustic wave, the vibration being detected via an electrical transduction. The transduction may be achieved by way of piezoelectric materials, or via a capacitive effect.

However, in certain applications, it is advantageous to detect a vibration of a membrane via optical transduction. Specifically, optical transduction may allow a remote measurement, without contact. This is particularly appropriate in certain environments (subject to stresses of a thermal or electromagnetic nature) in which electrical transduction is not possible. Moreover, optical transduction is suitable for environments in which there is a risk of explosion.

Devices based on optical transduction have been described in the publications:

Gallego D. "High-sensitivity ultrasound interferometric single-mode polymer optical fiber sensors for biomedical applications", Opt Letter, Vol. 34, no 12, p. 1807, June 2009;

Chen K. "Fiber-optic Fabry Perot interferometer based high sensitive cantilever microphone", Sens. Actuators Phys., vol. 279, p. 107-112, August 2018;

WO2014/195372;

S. M. Leinders "A sensitive optical micro-machined ultrasound sensor (OMUS) based on a silicon photonic ring resonator on an acoustical membrane", Sci. Rep., vol. 5, No 1, November 2015.

The inventors have designed a device that is particularly compact, simple to manufacture, and that has a high detection sensitivity.

SUMMARY OF THE INVENTION

A first subject of the invention is a device for detecting an acoustic wave, comprising:

a membrane, carrying a waveguide, the membrane being configured to vibrate at a frequency of the acoustic wave;

the waveguide comprising a first reflector, and a second reflector, each reflector reflecting light in a reflection spectral band, the waveguide being configured to vibrate with the membrane;

the first reflector and the second reflector being spaced apart from each other, so as to form a resonant optical cavity, the resonant optical cavity defining a resonant wavelength, in the reflection spectral band;

such that the waveguide:
    transmits light at the resonant wavelength;
    reflects light, in the reflection spectral band, not of the resonant wavelength;
the device also comprising:
    a laser light source, configured to emit a light wave, at an emission wavelength, into the waveguide;
    a photodetector, arranged to detect a light wave transmitted by the waveguide at the resonant wavelength;
    a servo circuit, connected to the light source and to the photodetector, and configured to servo-control the wavelength of the emission wave to the resonant wavelength of the resonant optical cavity at various times;
    a processing unit, connected to the servo circuit, and configured to:
        determine a periodic time-dependent variation in the emission wavelength under the effect of a vibration of the membrane, the periodic time-dependent variation in the emission wavelength corresponding to a periodic variation in the resonant wavelength;
        estimate an amplitude of the acoustic wave on the basis of the periodic time-dependent variation in the emission wavelength.

According to one embodiment, each reflector is a Bragg mirror, formed via a periodic modulation of a refractive index along the waveguide.

Preferably, the servo circuit comprises a servo loop, connected to the light source, and configured to servo-control the emission wavelength of the light wave emitted by the light source to the resonant wavelength of the resonant optical cavity. The servo circuit may notably implement a top-of-fringe locking servo technique.

Preferably, the laser light source emits the light wave in an emission spectral band of width smaller than 10 pm, or even than 1 pm. More generally, the emission spectral band is narrower than a width of the resonant peak of the resonant optical cavity.

According to one embodiment:
    the first reflector is a first Bragg mirror;
    the second reflector is a second Bragg mirror;
    the first Bragg mirror and the second Bragg mirror form the same Bragg mirror, the latter comprising a defect, the first Bragg mirror and the second Bragg mirror corresponding to the portions of the Bragg mirror lying on either side of the defect, respectively.

The membrane exhibits, under the effect of the vibration, at least one vibration antinode, the amplitude of vibration being maximum at each vibration antinode. The waveguide preferably lies level with at least one vibration antinode.

According to one embodiment, the waveguide is formed directly on the membrane. It may notably be formed by inscription by femtosecond laser.

According to one embodiment, the waveguide is a microstructured optical fiber deposited on the membrane.

A second subject of the invention is a method for detecting an amplitude of an acoustic wave using a device according to the first subject of the invention, comprising:

a) vibration of the membrane, under the effect of the acoustic wave, the membrane vibrating at a vibration frequency corresponding to a frequency of the acoustic wave, the vibration of the membrane causing a vibration of the waveguide, under the effect of which vibration the resonant wavelength of the waveguide is periodically modulated;

b) activating the laser light source, such that the light source emits a light wave, at an emission wavelength, into the waveguide;

c) using the servo circuit, servo-controlling the emission wavelength to the resonant wavelength, such that the emission wavelength varies periodically, the time-dependent variation in the emission wavelength corresponding to the periodic modulation of the resonant wavelength, at the frequency of the acoustic wave;

d) on the basis of the time-dependent variation in the emission wavelength, which variation is obtained via the servo circuit, estimating, by means of the processing unit, an amplitude of the acoustic wave.

A third subject of the invention is a process for producing a device according to the first subject of the invention, the device being such that the waveguide is formed directly on the membrane, the process comprising:

depositing a thin layer of a first material on a membrane, so as to form a waveguide;

inscribing the waveguide with a femtosecond laser beam, so as to obtain a periodic modulation of a refractive index of the waveguide.

The invention will be better understood on reading the description of the exemplary embodiments, which are described, in the rest of the description, with reference to the figures listed below.

DESCRIPTION OF PARTICULAR EMBODIMENTS

Figure 1A:
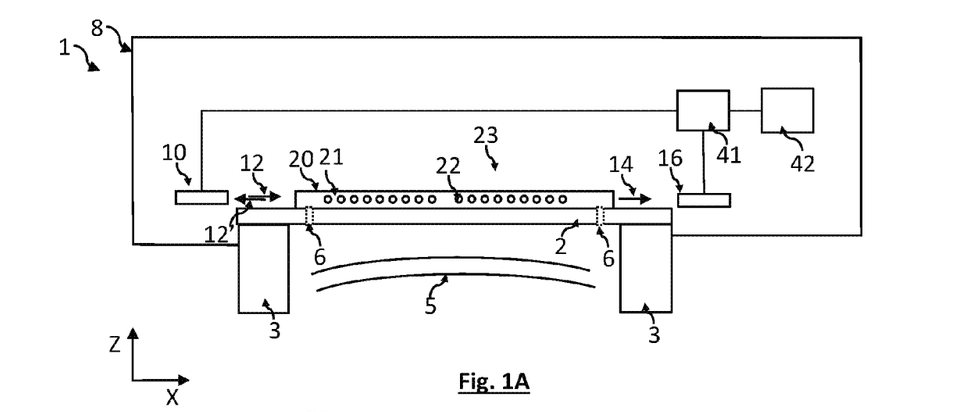
FIGS. 1A to 1C show a first example of a device according to the invention.
Figure 1B:
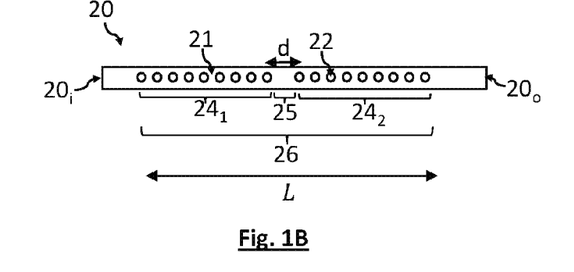
Figure 1C:
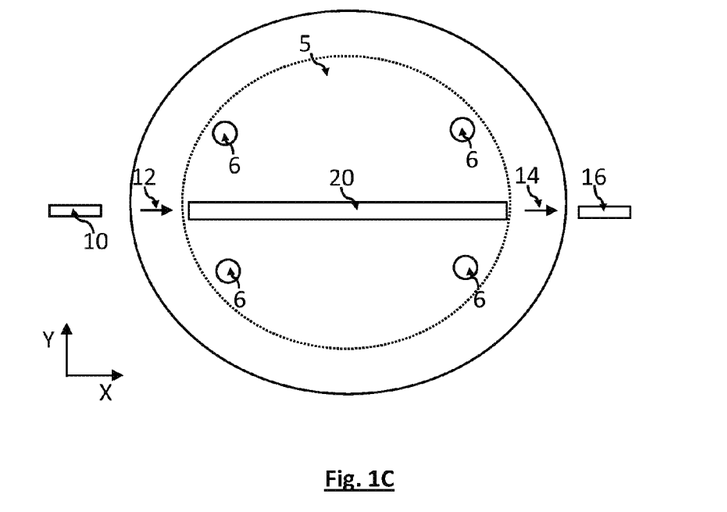

FIGS. 1A to 1C show one example of a device 1 according to the invention. The device comprises a flexible membrane 2, configured to vibrate when it is exposed to an incident acoustic wave 5. The frequency of the incident acoustic wave may be comprised in the domain of audible acoustic waves, or of ultra-sonic acoustic waves. The membrane 2 may thus vibrate in a frequency band comprised between 20 Hz and 20 kHz (audible range) and/or lying beyond 20 kHz, and for example between 20 kHz and a few tens of MHz.

In the example shown, the membrane 2 lies in a radial plane $P_{XY}$, perpendicular to a transverse axis Z.

The membrane 2 is connected, via its periphery, to a substrate 3, which forms a body of the device. The diameter $\phi$, or the longest diagonal, of the membrane may be comprised between 1 mm and 10 mm. The thickness of the membrane, along the transverse axis, may be comprised between 10 μm and a few mm, the thickness depending on the radius r or the diameter $\phi$ of the membrane. The thickness may be comprised between a few thousandths ($10^{-3}$) and one tenth ($10^{-1}$) of the radius. It may for example be equal to one hundredth of the radius.

The membrane 2 preferably comprises through-apertures 6, extending parallel to the transverse axis Z. Such apertures allow the pressure on either side of the membrane to be kept in equilibrium. They prevent the membrane from becoming deformed as a result of a slow appearance of a difference in the pressure on either side of the membrane. By slow appearance, what is meant is a pressure difference that occurs at a frequency lower than an operating frequency range of the membrane. The diameter of the apertures 6 is for example smaller than one tenth of the diameter of the membrane. It is for example of the order of 10 μm or 20 μm.

A waveguide 20 extends over the membrane 2, in contact with the latter and parallel to the latter. The waveguide extends between an entrance $20_i$ and an exit $20_o$. The waveguide is made from a first material 21 with a first refractive index $n_1$.

The waveguide 20 may be an optical fiber, in which case the first material is the material of the core of the optical fiber. It may also be a question of a waveguide formed from a deposit of a thin layer of the first material 21, SiON (silicon oxynitride) for example, this corresponding to the example shown in FIGS. 1A to 1C. The waveguide is bounded by a confining material 23, the refractive index of which is lower than the refractive index $n_3$ of the first material $n_1$. When the waveguide 20 is an optical fiber, the confining material 23 is the cladding of the optical fiber.

The waveguide 20 is advantageously formed from a thin layer of the first material 21. The confining material 23 may simply be the air surrounding the first material. The thickness of the waveguide, along the transverse axis Z, is preferably smaller than 10 μm or 5 μm. The process used to form such a waveguide is described with reference to FIGS. 7A to 7D. Forming a waveguide directly on the membrane allows a step of bonding the optical fiber to the membrane to be avoided. Another advantage, with respect to use of an optical fiber, is that this allows a less rigid waveguide to be obtained.

Whatever the chosen configuration, the refractive index $n_3$ of the confining material 23 is lower than the refractive index $n_1$ of the first material 21. When the first material 21 is deposited directly on the membrane, the refractive index $n_1$ of the first material 21 is higher than the refractive index of the material from which the membrane 2 is formed.

One example of a waveguide 20 is illustrated in FIG. 1B. In this example, the first material 21 is deposited on the membrane 2. The waveguide comprises segments of a second material 22, of a second refractive index $n_2$, these segments being periodically distributed along the waveguide 20. The second refractive index $n_2$ is different from the first refractive index $n_1$. The relative variation between the first refractive index and the second refractive index may vary from 0.01% ($10^{-4}$) to 0.1% ($10^{-3}$).

Along the axis along which the waveguide extends, the refractive index is periodically modulated, between $n_1$ and $n_2$, so as to form a Bragg mirror in a reflection spectral band $\Delta\lambda_{20}$. The structure of a Bragg mirror is known to those skilled in the art. It is a structure in which the refractive index varies periodically, such that, along the axis along which the light propagates, the mirror is formed by a periodic alternation of segments of two different indices, the optical thickness of each segment being $\lambda_B/4n_i$, where $\lambda_B$ is a central wavelength of the reflection spectral band $\Delta\lambda_{20}$ and $n_i$ is the refractive index of the material in question ($n_i=n_1$ or $n_i=n_2$). The lower the refractive index contrast, the higher the number of periods.

The reflection spectral band $\Delta\lambda_{20}$ is centered on a resonant wavelength $\lambda_r$, also called the Bragg wavelength $\lambda_B$, and such that:

$$\lambda_r = \lambda_B = 2n_{eff}\Lambda \quad (1)$$

where r $n_{eff}$ is an effective index of the grating, such that $$n_{eff} = \frac{n_1 + n_2}{2} \quad (2)$$

$\Lambda$ is the spatial period of the grating, i.e. the length of two successive segments 21 and 22 along the axis of the waveguide.

The waveguide 20 is such that the Bragg mirror, formed by the alternation of segments 21 and 22, comprises a defect. By defect, what is meant is a localized break in the periodicity of the refractive-index modulation. The defect for example corresponds to a continuous space 25, made of a given material, the first material 21 for example, extending the length of one period $\Lambda$ or the length of a plurality of successive periods. See FIG. 1B. Level with the defect, the waveguide comprises a single material, extending a distance d along the axis of the waveguide 20. When the distanced d is such that $$d = \frac{k\lambda_B}{n_{eff}}, \quad (1')$$

where k is a positive natural integer, a resonant Fabry-Perot optical cavity 26 is formed, defining a resonant wavelength $\lambda_r$. When the defect 25 extends over a single period $\Lambda$, $\lambda_r = \lambda_B$.

When $d > k\lambda_B/n_{eff}$, other resonant wavelengths $\lambda_r$ may appear, in the reflection spectral band $\Delta\lambda_{20}$, the resonant wavelengths being different from the Bragg wavelength $\lambda_B$.

In such a case, the resonant wavelength at which the resonant peak is narrowest is preferably retained.

Thus, the defect allows, in the waveguide 20, a first Bragg mirror $24_1$ and a second Bragg mirror $24_2$ to be separated. The assembly formed by the first Bragg mirror $24_1$, the second Bragg mirror $24_2$, and the space 25 between the Bragg mirrors forms the resonant cavity 26.

The waveguide is then structured to:
reflect light in the reflection spectral band $\Delta\lambda_{20}$ of the Bragg mirrors $24_1$, $24_2$, not of the resonant wavelength $\lambda_r$;
transmit light at the resonant wavelength $\lambda_r$ of the resonant cavity 26.

The device 1 also comprises a light source 10, in particular a laser diode, arranged to emit an incident light wave 12 toward the entrance 20, of the waveguide 20. The light wave 12 is emitted in an emission spectral band $\Delta\lambda_{12}$, centered on an emission wavelength $\lambda_{12}$. The emission spectral band $\Delta\lambda_{12}$ is included in the reflection spectral band $\Delta\lambda_{20}$. It is preferably narrower than the width of the resonant peak associated with the resonant wavelength $\lambda_r$. The fact that the width of the emission spectral band $\Delta\lambda_{12}$ is narrower than the width of the resonant peak allows the emission wavelength $\lambda_{12}$ to be precisely adjusted with respect to the resonant wavelength $\lambda_r$ of the waveguide. This adjustment is performed by a servo circuit 41 described below.

The width of the emission spectral band $\Delta\lambda_{12}$ is preferably smaller than 10 pm or 1 pm. By width of the emission spectral band $\Delta\lambda_{12}$, what is meant is a full width at half maximum of the emission spectral band.

The light source 10 is preferably a continuous-wave laser. It may for example be a DFB laser diode (DFB being the acronym of distributed feedback), with a power of 1 mW, emitting at a wavelength of 1.55 μm, with a spectral width of the order of one pm. This type of laser diode is commonly used in the field of telecommunications.

The device 1 comprises a photodetector 16, preferably a fast photodetector, and here a photodiode. The photodetector has a detection spectral band $\Delta\lambda_{16}$ that contains the reflection spectral band $\Delta\lambda_{20}$.

The device 1 comprises a servo circuit 41, configured to follow a time-dependent variation $\lambda_r(t)$ in the resonant wavelength $\lambda_r$ of the resonant cavity 26 under the effect of the vibration of the membrane. Such a circuit is described below, with reference to FIGS. 4A and 4B. The servo circuit 41 allows the light source 10 to be servo-controlled, such as to make the emission wavelength $\lambda_{12}$ of the light wave 12 emitted by the light source correspond to the resonant wavelength $\lambda_r$ of the resonant cavity 26.

The device comprises a processing unit 42, configured to estimate an amplitude of the acoustic wave 5 under the effect of which the membrane 2 vibrates. The amplitude of the acoustic wave is estimated on the basis of the temporal modulation $\lambda_{12}(t)$ of the emission wavelength $\lambda_{12}$ determined by the servo circuit 41. The operation of the processing unit 42 will be described in more detail with reference to FIGS. 5A to 5C.

The device comprises a cover 8 that defines a rear volume, the rear volume corresponding to the volume extending between the membrane 2 and the cover 8.

Generally, the waveguide 20 comprises a resonant cavity 26, formed from a first reflector $24_1$ and from a second reflector $24_2$, said reflectors being obtained by microstructuring the waveguide 20 in such a way as to induce a periodic variation in refractive index.

One important facet of the invention, which facet is explained below, is to do with the fact that:

when the light source 10 is activated, and emits a light wave 12 the emission wavelength $\lambda_{12}$ of which does not correspond to the resonant wavelength $\lambda_r$ of the waveguide 20 (or more precisely of the resonant cavity 26), the waveguide 20 reflects a reflected wave 12'; but when the light source 10 is activated, and emits a light wave 12 the emission wavelength $\lambda_{12}$ of which corresponds to the resonant wavelength $\lambda_r$ of the resonant cavity 26, the waveguide 20 transmits a transmitted wave 14 to the photodetector 16. The closer the emission wavelength $\lambda_{12}$ gets to the resonant wavelength $\lambda_r$, the higher the intensity of the transmitted wave 14.

The invention is based on the fact that, on being exposed to an acoustic wave 5 of acoustic amplitude $A_a$, the membrane 2 vibrates with an amplitude of vibration at the frequency $f_a$ of the acoustic wave 5. This results in a periodic deformation of the waveguide 20, under the effect of which deformation the resonant wavelength $\lambda_r$ exhibits a periodic time-dependent modulation $\lambda_r(t)$. The amplitude $A_{\lambda_r}$ of the time-dependent modulation depends on the amplitude of vibration of the membrane, said amplitude being correlated with, and for example proportional to, the acoustic amplitude $A_a$. Thus, by estimating the amplitude $A_{\lambda_r}$, the device allows the acoustic amplitude $A_a$ to be estimated.

FIG. 10 shows a view of certain elements described with reference to FIG. 1A, in the radial plane $P_{XY}$. In this example, the membrane 2 takes the form of a thin disc, the thickness being one hundredth of the radius.

Figure 2A:
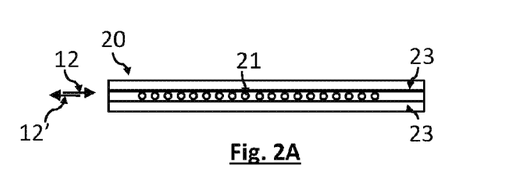
FIG. 2A shows a microstructured optical fiber, forming a Bragg mirror.
Figure 2B:
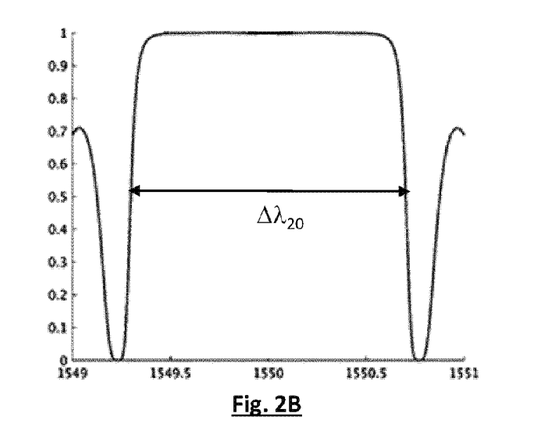
FIG. 2B shows a reflection spectral band of the optical fiber schematically shown in FIG. 2A.

FIG. 2A illustrates an embodiment in which the waveguide 20 is a microstructured optical fiber, inside of which a Bragg grating is formed. This type of microstructuring, in an optical fiber, is usually designated a fiber Bragg grating (FBG). The optical fiber comprises a first material 21 forming the core and a confining material 23 forming the cladding. In the core of the optical fiber are formed inclusions or cavities of a second material 22, the refractive index of which is different from that of the first material. FIG. 2B shows a reflection spectrum of the optical fiber thus microstructured. The reflection spectrum corresponds to a reflected intensity normalized by the illumination intensity (y-axis) as a function of wavelength (x-axis—unit nm). The reflection is maximum in the reflection spectral band $\Delta\lambda_{20}$. Thus, when such a waveguide is illuminated by a light wave 12, in the reflection spectral band $\Delta\lambda_{20}$, it reflects a light wave 12', in the entire reflection spectral band $\Delta\lambda_{20}$.

Figure 2C:
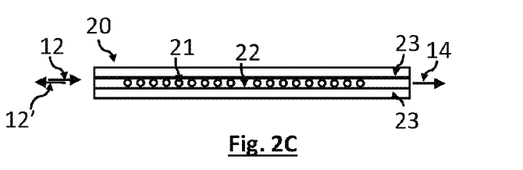
FIG. 2C shows a microstructured optical fiber, forming a resonant optical cavity based on two spaced-apart Bragg mirrors.

FIG. 2C illustrates a similar optical fiber, in which two Bragg mirrors $24_1$ and $24_2$ are separated by a space 25 filled with the first material 21, as described with reference to FIG. 1B. When the length of the space 25 corresponds to $$\frac{k}{n_{\textit{eff}}}$$

times a resonant wavelength, comprised in the reflection spectral band, the optical fiber comprises a resonant cavity 26.

Figure 2D:
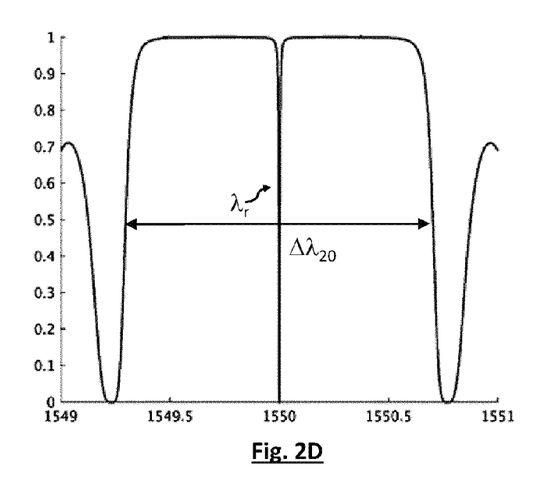
FIG. 2D shows a reflection spectral band of the optical fiber schematically shown in FIG. 2C.

FIG. 2D shows a reflection spectrum of the optical fiber thus microstructured. The reflection is maximum in the reflection spectral band $\Delta\lambda_{20}$, except at the resonant wavelength $\lambda_r$. Thus, when such a waveguide is illuminated by a light wave 12, in the reflection spectral band $\Delta\lambda_{20}$, it reflects a light wave 12', if the wavelength $\lambda_{12}$ is different from the resonant wavelength, and transmits a light wave 14, called the transmitted light wave, when the wavelength $\lambda_{12}$ is located in the resonant peak.

FIGS. 2C and 2D were obtained using models, written in Matlab (registered trademark—Mathworks), in which the structuring was considered to extend along a length L of 3 mm, the index contrast between the first and second materials 21, 22 was considered to be $10^{-3}$, and the period of each Bragg mirror was considered to be about 0.5 µm. Thus, each Bragg mirror has a number of periods equal to 3000.

Figure 3A:
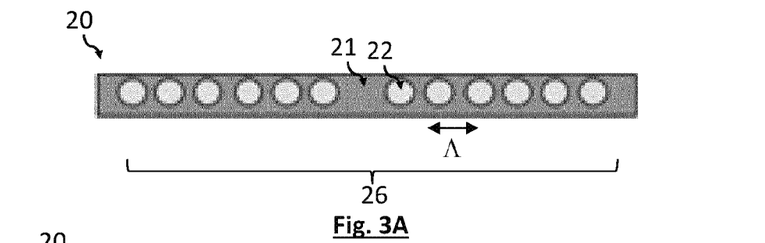
FIG. 3A shows a waveguide comprising a resonant optical cavity, the waveguide being undeformed.
Figures 3B, 3C:
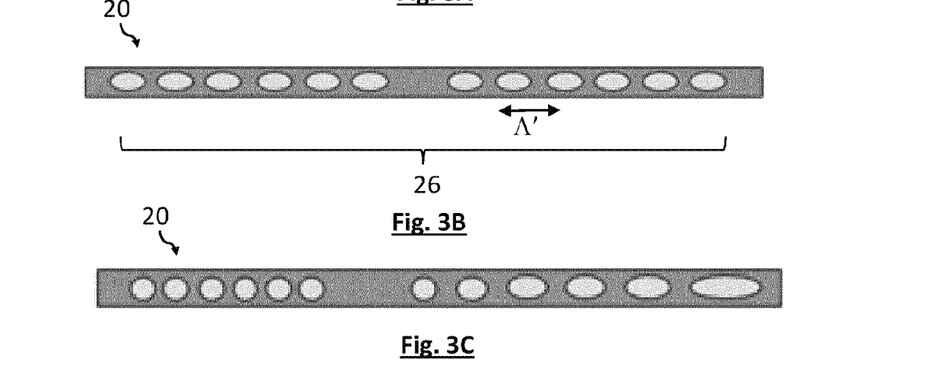
FIG. 3B shows a waveguide comprising a resonant optical cavity, deformed.
FIG. 3C shows a waveguide the deformation of which is non-uniform.

FIGS. 3A to 3C illustrate the variation in the resonant wavelength $\lambda_r$ resulting from a deformation of a waveguide 20 such as illustrated in FIG. 1B or 2C. FIGS. 3A and 3B show the waveguide 20 undeformed and deformed, respectively. Under the effect of the deformation, the spatial period of the index modulation varies from $\wedge$ to $\wedge' = \wedge + d\wedge$. Application of expression (1) results in a shift $d\lambda_B$ in the Bragg wavelength $\lambda_B$, about which wavelength extends the reflection spectral band $\Delta\lambda$. The shift of $\lambda_B$ is such that:

$$\frac{1}{\lambda_B} \times \frac{\partial \lambda_B}{\partial \varepsilon} = 0.78 \times 10^{-6} \mu\varepsilon^{-1}, \tag{3}$$

where:

$\varepsilon$ corresponds to the deformation, expressed in µε (microstrains), corresponding to $10^{-4}\%$. The deformation $\varepsilon$ is a normalized variation in length, such that:

$$\varepsilon = \frac{d\wedge}{\wedge} \times 10^{-2} \tag{4}$$

× is the multiplication operator.

Expression (3) was obtained considering the case where the membrane is made of $SiO_2$, and the index jump between the first material and the second material is $10^{-3}$. It is based on a uniform deformation of each Bragg mirror, as shown in FIG. 3B. According to expression (3), for a deformation of 1µε, the shift $d\lambda_B$ in the Bragg wavelength $\lambda_B$ is 1.2 pm.

In FIG. 3C, a non-uniform deformation of the waveguide 20 has been shown, certain segments of the Bragg mirrors being less deformed than others.

Figure 3D:
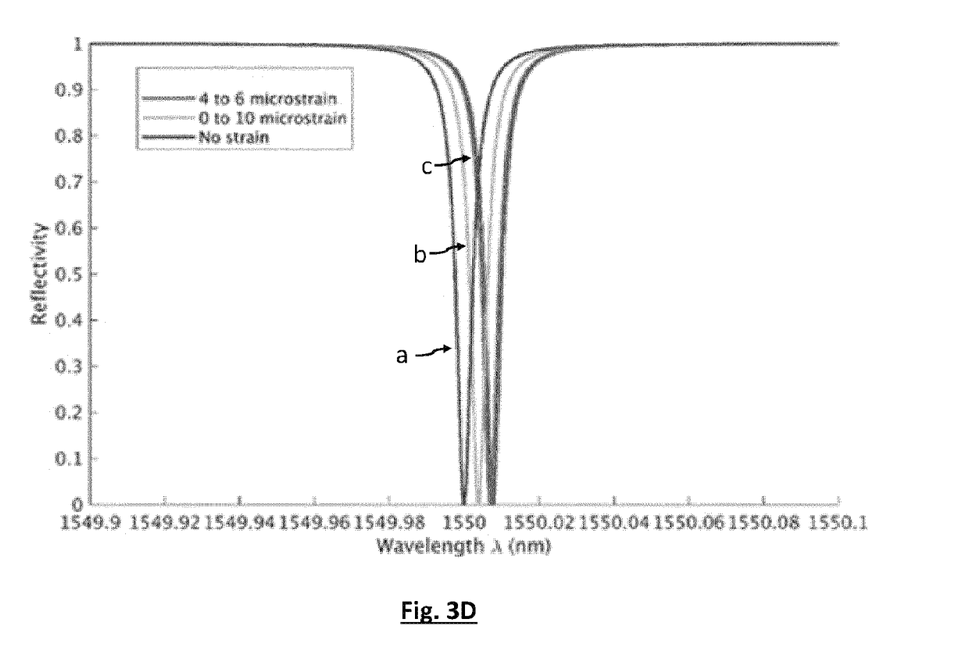
FIG. 3D shows a variation in the reflection spectral band of a waveguide, such as shown in FIG. 3C, under the effect of deformations.

FIG. 3D is a model showing the variation in the reflection spectrum of a Bragg mirror, in a configuration such as described with reference to FIG. 3C. Curves a, b and c correspond to an absence of deformation, to a linear deformation comprised between 0 and 10 microstrains along the axis of the waveguide, and to a linear deformation comprised between 4 to 6 microstrains along the axis of the waveguide, respectively. The spectral shift is small, smaller than 10 pm. Curves b and c correspond to the same average deformation of the waveguide, equal to 5 microstrains. The shift in the resonant wavelengths between these two configurations is due to the variation in strain along the axis of the waveguide, in the range 0-10 microstrains and 4-6 microstrains respectively. The more uniform the deformation, the larger the spectral shift of the resonant wavelength, under the effect of the deformation.

Preferably, the waveguide 20 extends over the portions of the membrane 2 that are subjected to the largest deformation. The membrane 2 exhibits one or more vibration antinodes, at which the amplitude of vibration is maximum. Each antinode may be determined by modeling and/or experimentally. Preferably, the waveguide 20 extends over at least one antinode of vibration of the membrane. This maximizes the deformation of the waveguide 20, this further increasing the spectral shift resulting from the deformation. A better sensitivity is thus obtained.

Figure 3E:
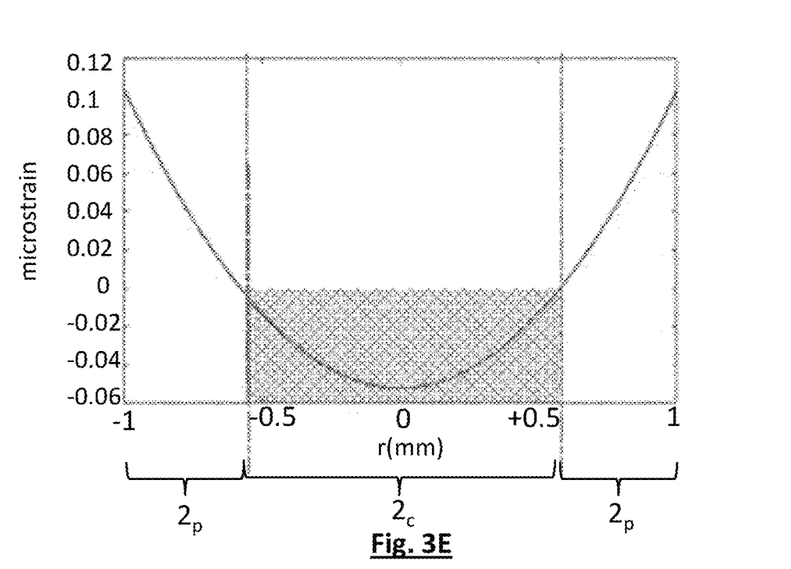
FIG. 3E shows an amplitude of radial deformation of a membrane, along a diameter of the latter.

The inventors have modeled a deformation of a membrane 2, such as schematically shown in FIGS. 1A and 1C. The modeled membrane was made of $SiO_2$, was of 1 mm radius and 10 μm thickness, and was subjected to a pressure of 1 Pa. The deformation of the membrane, along one of its diameters, is shown in FIG. 3E, the x-axis corresponding to the distance from the center of the membrane (in mm) and the y-axis corresponding to the deformation, in microstrains. The resonant cavity 26 is preferably placed level with the maximum amplitude of deformation, i.e. at the center of the membrane 20. The simulation illustrated in FIG. 3E shows that, with this membrane, application of a pressure of 1 Pa induces a deformation of some $10^{-2}$ microstrains.

Furthermore, in order to achieve the most uniform possible deformation, it is preferable for the resonant cavity 26 to be placed in portions of the membrane where, under the effect of the deformation, the curvature is as uniform as possible. In other words, it is a question of portions of the membrane where the derivative of the curvature is low.

In FIG. 3E, the deformation of the membrane is negative in the central portion $2_c$ and positive in the peripheral portion $2_p$. The resonant cavity 26 is advantageously placed on a segment of the membrane 2 in which, under the effect of the vibration of the membrane, the deformation is of same sign, irrespective of whether it is a question of a compression or of an expansion.

Figure 3F:
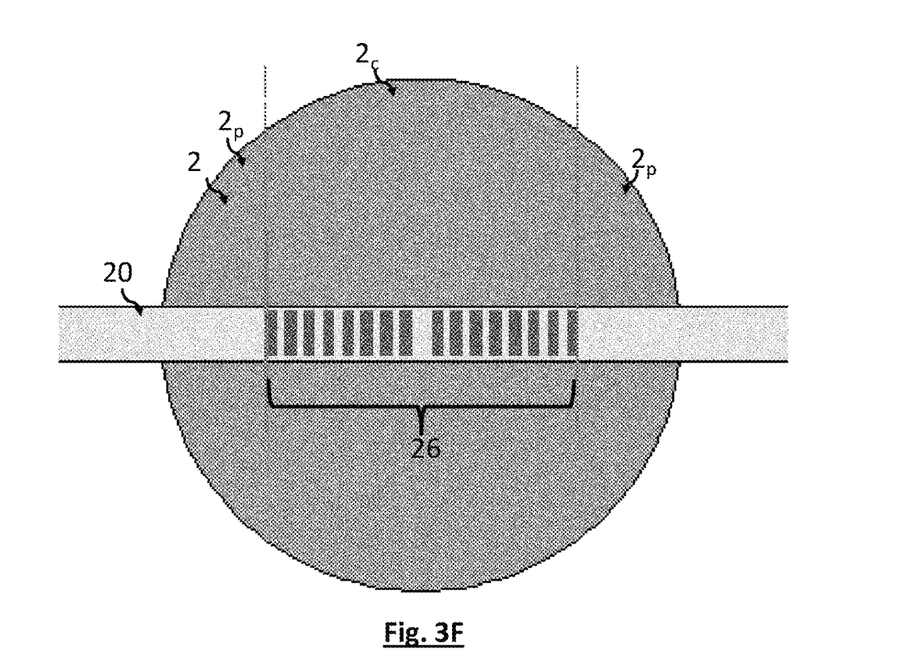
FIG. 3F shows a waveguide that is optimally positioned, for the deformation shown in FIG. 3D.

FIG. 3F schematically shows a waveguide 20 the resonant cavity 26 of which is positioned on the central part $2_c$ of the membrane 2, the waveguide extending, on either side of the center of the membrane, a distance of ±0.5 mm from the center. Under the effect of the vibration of the membrane, the deformation is alternately negative (ε<0), as shown in FIG. 3E, then positive. When the deformation is negative, the optical cavity is compressed: the segments of the second material 22 get closer to one another. When the deformation is positive, the optical cavity expands: the segments of the second material 22 move away from one another.

Figure 4A:
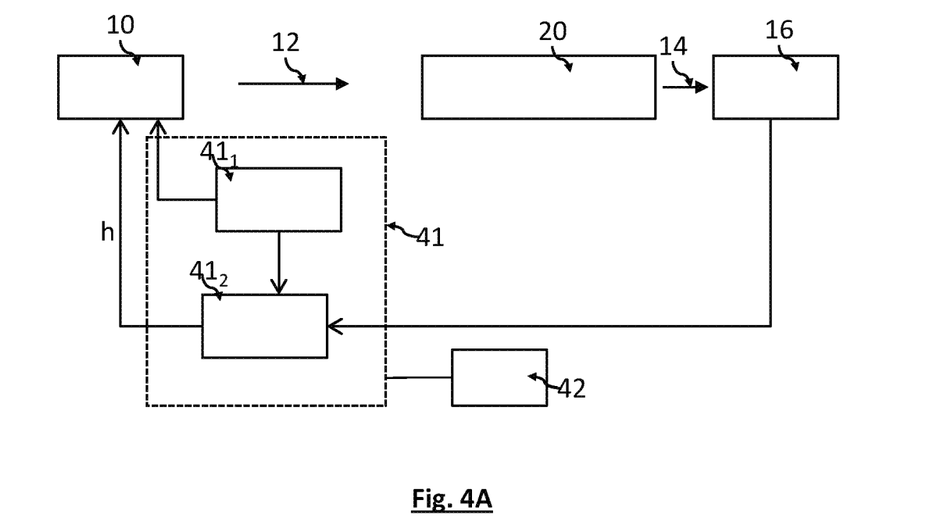
FIG. 4A schematically shows a circuit for servo-controlling the wavelength of the light source using a top-of-fringe locking method.
Figure 4B:
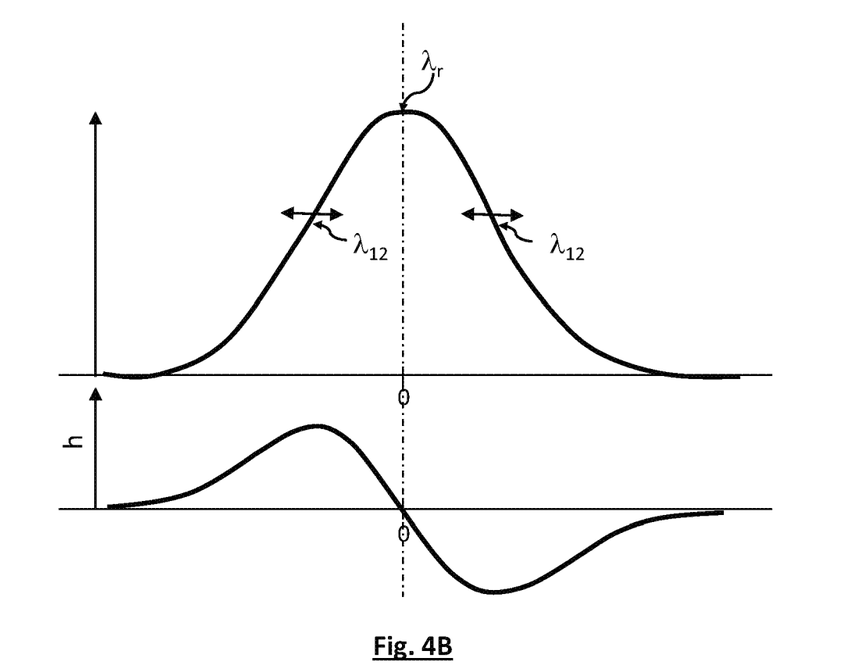
FIG. 4B shows the variation in an error function obtained using the top-of-fringe locking method.

FIGS. 4A and 4B schematically show the operation of the servo circuit 41, the function of which is to servo-control the emission wavelength $\lambda_{12}$ to the resonant wavelength $\lambda_r$ of the resonant cavity 26 formed in the waveguide 20. The servo circuit 41 locks the wavelength $\lambda_{12}$ to the resonant wavelength $\lambda_r$. It does this using top-of-fringe locking. It is for example a question of a circuit employing Pound-Drever-Hall servo technique, such a circuit being described in the publication Chow J. H. "Phase-sensitive interrogation of fiber Bragg grating resonators for sensing applications", J. Light. Technol., vol. 23, No. 5, pp. 1881-1889, May 2005, or even in the publication Black E. "An introduction to Pound-Drever-Hall laser frequency stabilization", Am. J. Phys. 69 (1), January 2001.

The servo circuit 41 comprises a modulator 411, for modulating the wavelength $\lambda_{12}$ of the light wave 12 emitted by the light source 10, at a high modulation frequency that may vary from 10 kHz to several hundred MHz. The modulation frequency of the emission wavelength $\lambda_{12}$ is much higher than the maximum acoustic frequency addressed by the device. It may for example be at least 10 times higher than the maximum acoustic frequency addressed by the device. The intensity of the light wave 14, transmitted by the waveguide 20 and detected by the photodetector 16, is transmitted to the circuit 41, the latter measuring a function h expressing a variation in the intensity detected by the photodetector 16 as a function of the wavelength modulation.

Depending on the sign of the function h, an error signal is sent to the light source, so as to increase or decrease the emission wavelength $\lambda_{12}$. For example, when the detected variation in intensity as the wavelength increases is negative, the emission wavelength is gradually decreased. When the detected variation in intensity as the wavelength increases is positive, the emission wavelength is increased. When the detected variation in intensity caused by the modulation is close to zero, the emission wavelength corresponds to the resonant wavelength of the waveguide. The servo circuit 41 uses the fact that:

when $\lambda_{12} < \lambda_r$, an increase in the emission wavelength $\lambda_{12}$ results in an increase in the intensity of the transmitted wave 14. Conversely, a decrease in the wavelength $\lambda_{12}$ results in a decrease in the intensity of the transmitted wave 14;

when $\lambda_{12} > \lambda_r$, an increase in emission wavelength $\lambda_{12}$ results in a decrease in the intensity of the transmitted wave 14. Conversely, a decrease in the wavelength $\lambda_{12}$ results in an increase in the intensity of the transmitted wave 14.

Thus, by applying a small modulation to the wavelength $\lambda_{12}$ of the emission light wave 12, and by observing the effect of the modulation on the intensity of the transmitted light wave 14, the light source 10 may be servo-controlled, to make the emission wavelength $\lambda_{12}$ track the resonant wavelength $\lambda_r$ of the waveguide 20.

Tracking the resonant wavelength by top-of-fringe locking allows the resonant wavelength to be tracked with a wavelength sensitivity of the order of $10^{-6}$ pm when the acoustic frequency of the acoustic wave 5 is higher than 10 kHz, or of the order of $10^{-3}$ pm when the acoustic frequency is lower than 1 kHz. In light of expression (3), which applies to an $SiO_2$ membrane, it is estimated that such a sensitivity will allow a deformation of the membrane of the order of a few picostrains, or equivalent to a few mPa, to be estimated. The Pound-Drever-Hall method is therefore appropriate, given the small spectral shifts of the resonant cavity 26, said spectral shifts possibly being of the order of a few pm.

Tracking the resonant wavelength by top-of-fringe locking also allows the tracking to be made insensitive to fluctuations in the resonant wavelength of the cavity 26 under the effect of any variation in environmental parameters, such as temperature and humidity.

Figure 5A:
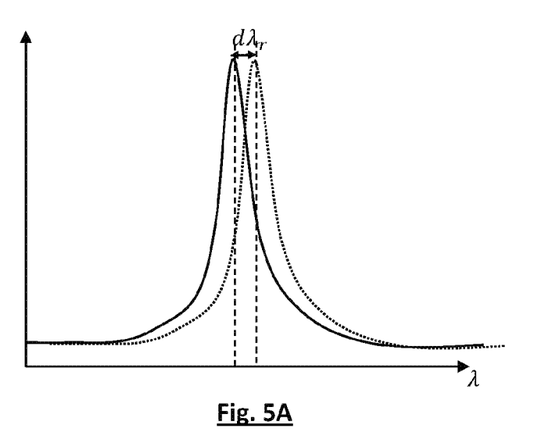
FIG. 5A illustrates a shift in the resonant wavelength of a resonant optical cavity, under the effect of a vibration of the membrane.
Figure 5B:
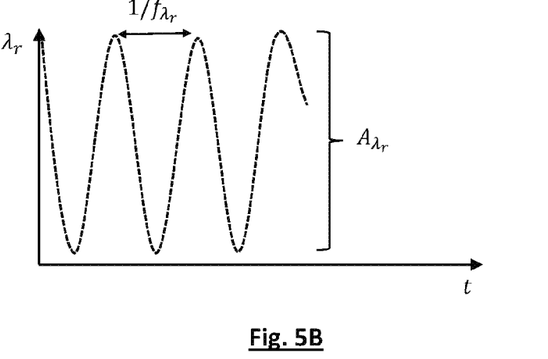
FIG. 5B shows a time-dependent modulation of the optical resonant wavelength.
Figure 5C:
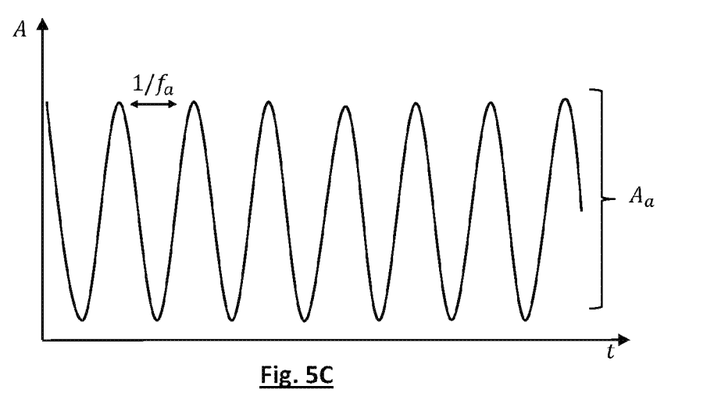
FIG. 5C schematically shows an estimate of the amplitude of vibration of a membrane based on the time-dependent modulation of the resonant wavelength.

FIGS. 5A to 5C illustrate the relationship between the periodic time-dependent variation $\lambda_{12}(t)$ in the emission wavelength $\lambda_{12}$, when the membrane 2 vibrates under the effect of an acoustic wave 5, and the amplitude of the acoustic wave. Because of the servo-control performed by the servo circuit 41, the periodic time-dependent variation in the emission wavelength $\lambda_{12}(t)$ is considered to correspond to the time-dependent modulation of the resonant wavelength $\lambda_r(t)$ induced by membrane vibration. FIG. 5A shows a spectrum of the transmitted light wave 14, and a spectral shift $d\lambda_r$ under the effect of deformation of the waveguide 20. FIG. 5B shows the time-dependent modulation of the resonant wavelength $\lambda_r$ resulting from the deformation of the waveguide 20, the modulation being periodic and of frequency $f_{\lambda_r}$ corresponding to the acoustic frequency $f_a$. The servo circuit 41, by servo-controlling the emission wavelength $\lambda_{12}$ to the resonant wavelength $\lambda_r$, allows such a modulation to be determined. The processing unit 42 is configured to analyze the periodic variation in the emission wavelength and to estimate the amplitude $A_{\lambda_r}$ of modulation of the resonant wavelength (or of the emission wavelength) at the frequency $f_a$. On the basis of the amplitude $A_{\lambda_r}$, the processing unit 42 estimates the amplitude $A_a$ of the acoustic wave 5.

The estimate of the acoustic amplitude $A_a$ on the basis of the amplitude $A_{\lambda_r}$ of modulation of the resonant wavelength may be determined via simulation and/or via experimental calibration.

It will be noted that the determination of the acoustic amplitude $A_a$ does not necessarily require a determination of the value of the resonant wavelength, but only a precise determination of the modulation amplitude $A_{\lambda_r}$.

Figure 6:
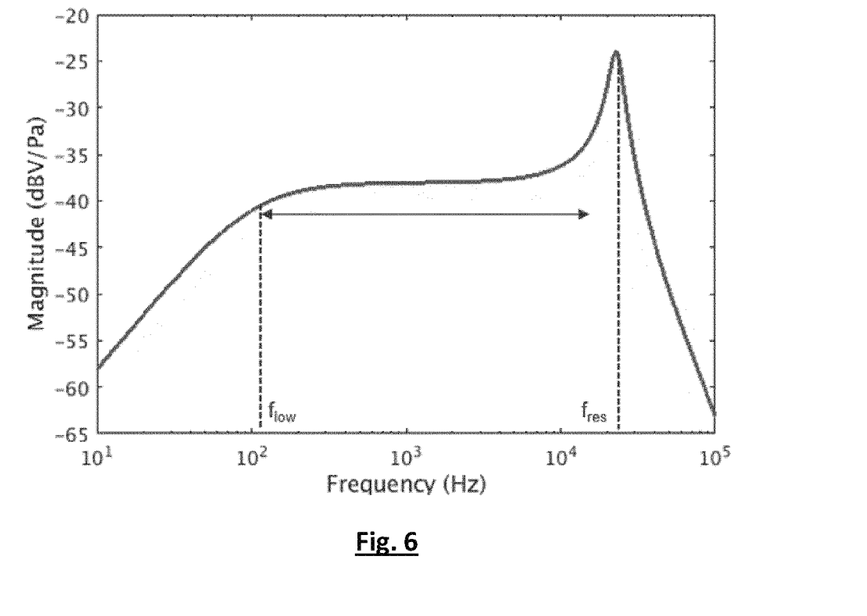
FIG. 6 shows a transfer function of a membrane, in an operating frequency band.
Figure 7A:
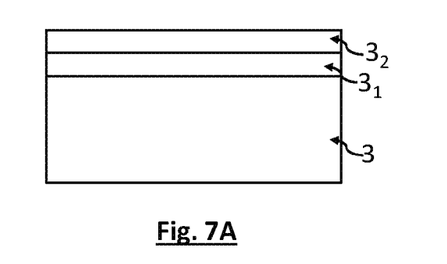
FIGS. 7A to 7D show the main steps of a fabricating process that allows a microstructured waveguide to be formed in contact with a membrane.
Figure 7B:
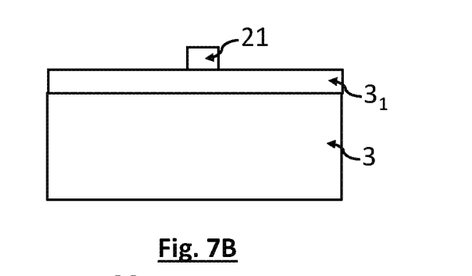
Figure 7C:
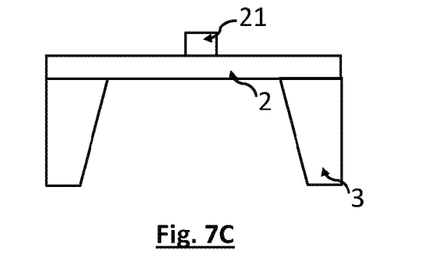
Figure 7D:
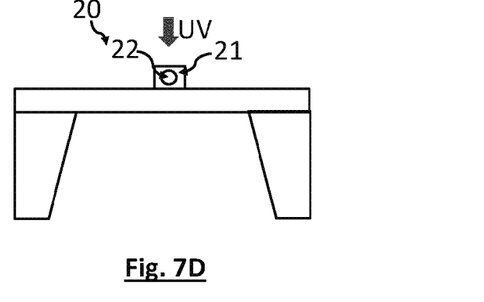

FIG. 6 corresponds to a selection of an operating frequency range of the device 1. FIG. 6 corresponds to the amplitude of deformation of the membrane (y-axis—units dBV/Pa) as a function of the acoustic frequency (x-axis—units Hz). The operating frequency range of the device corresponds to the flattest part of the curve. The operating frequency range extends between a low cutoff frequency $f_{low}$ and a mechanical resonant frequency $f_{res}$. In this example, the frequency range has been selected so as to cover audible acoustic waves, between 100 Hz and 20 kHz.

The low cutoff frequency is such that:

$$f_{low} = \frac{1}{2\pi R_6 C_8} \quad (6)$$

where $R_6$ quantifies viscous losses due to the apertures 6 in the membrane 2;

$C_8$ corresponds to a compressibility of the rear volume of the device, which volume was defined with reference to FIG. 1A.

It may be shown that:

$$R_6 = N \times 8\pi \eta \frac{e}{s_6^2} \quad (7)$$

where:

N corresponds to the number of apertures 6 in the membrane;

$\eta$ is the viscosity of air, in Pa·s;

e is the thickness of the membrane;

$s_6$ is the cross-sectional area of the apertures 6, the cross section being cut parallel to the radial plane $P_{XY}$.

Furthermore:

$$C_8 = \frac{V_8}{c_0^2 \rho_0} \quad (9)$$

where $V_8$ is the volume of the rear volume, in cm$^3$;

$c_0$ is the speed of sound in air, in ms$^{-1}$;

$\rho_0$ is the density of air, in g·cm$^{-3}$.

The resonant frequency of the membrane may be calculated according to the expression:

$$f_{res} = \frac{10.22}{2\pi} \frac{e}{r^2} \sqrt{\frac{E}{12\rho(1-v^2)}} \quad (10)$$

where:

r is the radius of the membrane 2, expressed in cm;

E is the Young's modulus of the material from which the membrane is formed;

$\rho$ is the density of the material from which the membrane is formed (g·cm$^{-3}$);

$v$ is the Poisson's ratio of the material from which the membrane is formed.

It is thus possible to select the operating frequency range as a function of the parameters defined above, so as to cover all or some of the audible or ultrasonic domain. The larger the thickness of the membrane and the smaller its diameter, the higher the resonant frequency $f_{res}$. Conversely, the thinner the membrane and the larger its diameter, the lower the resonant frequency $f_{res}$.

FIGS. 7A to 7D illustrate the main steps allowing a non-fiber-optic waveguide 20 to be formed on a membrane 2.

A substrate 3, an Si substrate for example, on which a 4 µm thick first layer $3_1$, of SiO$_2$ (index 1.44) for example, and a 1 µm thick second layer 32, of SiON (silicon oxynitride—index 1.60) for example, have been deposited, is provided. See FIG. 7A.

The method comprises:

etching the second layer 32, using photolithography, so as to form the waveguide 20. See FIG. 7B. In this example, SiON corresponds to the first material 21 of the waveguide.

etching the back side of the substrate 3, so as to release one portion of the first layer $3_1$, said portion forming the suspended membrane 2. See FIG. 7C.

exposure to femtosecond laser pulses, so as to form cavities of a second material 22. See FIG. 7D. Under the effect of the exposure to the laser, the index of the SiON changes locally. The exposed SiON then corresponds to a second material 22, the refractive index $n_2$ of which is different from that of the unexposed SiON. Specifically, the exposure generates microbubbles, this inducing a change in the refractive index. The exposure is carried out so as to obtain a regular and periodic distribution of the cavities 22. This results in a modulation of the refractive index of waveguide 20, along the axis of propagation of the light, inside the waveguide. The duration of each pulse is for example equal to 100 fs, at the wavelength of 800 nm, the energy of each pulse being 30 nJ. The pulse frequency may be comprised between a few Hz and 200 kHz.

Another exposure technique is UV photoinscription, which is described in the publication Chow J. H. "Phase-sensitive interrogation of fiber Bragg grating resonators for sensing applications", J. Light. Technol., vol. 23, No. 5, pp. 1881-1889, May 2005. UV photoinscription for example allows optical fibers to be microstructured.

The modulation of the refractive index resulting from exposure is relatively small, of the order of 10$^{-3}$. However, inscription by femtosecond laser allows Bragg mirrors to be produced over short lengths, of the order of one mm. This type of exposure allows a resonant cavity 26 of high finesse to be obtained, the width of the resonant peak being smaller than a few tens of pm, or even smaller than 10 pm, and possibly being of the order or less than 5 pm.

It is possible to increase the length over which each Bragg mirror extends. This further decreases the width of the resonant peak.

Figure 8A:
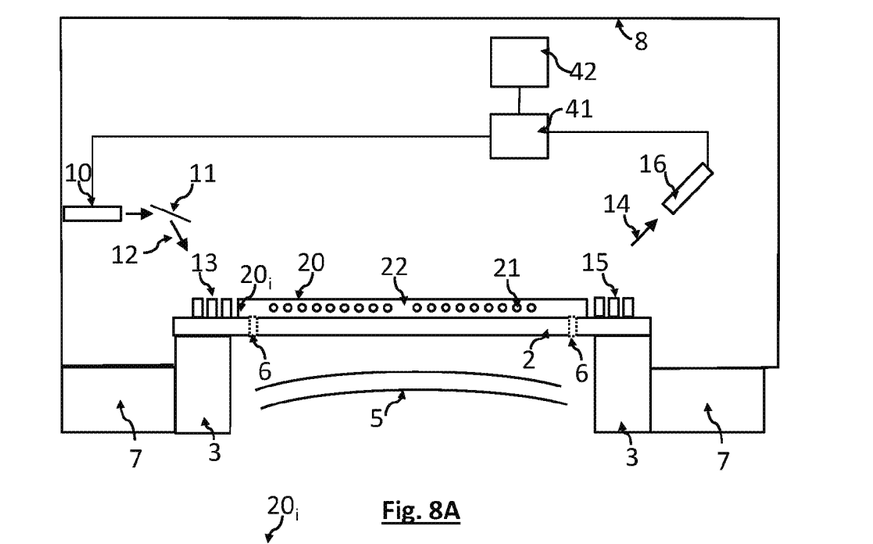
FIGS. 8A and 8B schematically show two possible configurations of a device according to the invention.
Figure 8B:
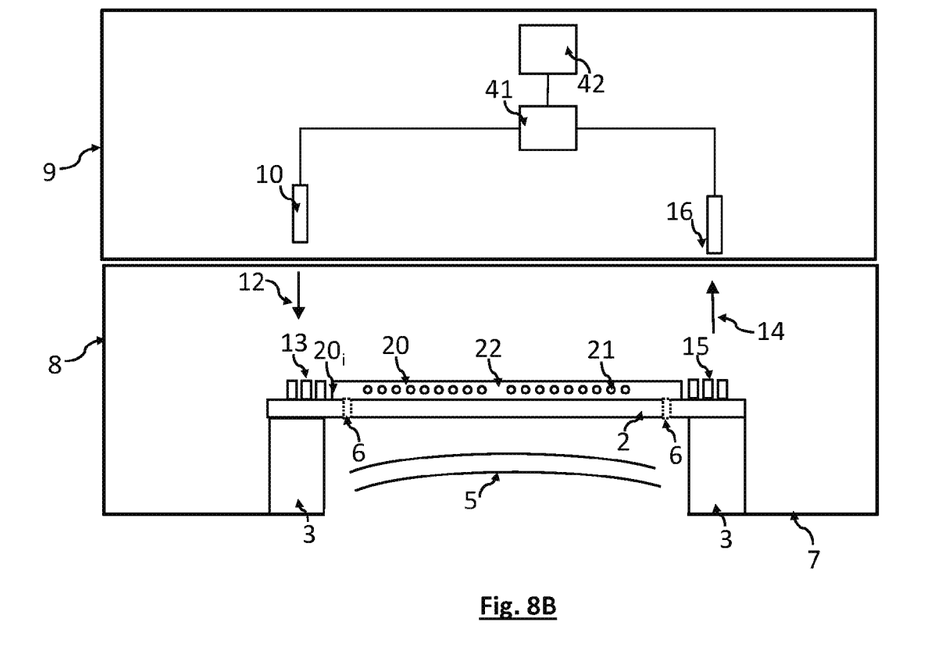

FIGS. 8A and 8B show examples of devices. In FIG. 8A, the device 1 is placed on a carrier 7 closed by a cover 8. The laser source 10 emits a light wave 12 parallel to the radial plane $P_{XY}$, the light wave being reflected by a reflector 11 in the direction of the membrane 2. An input coupling grating 13 allows the light wave 12, and the entrance 201 of the waveguide 20 to be coupled. An output coupling grating 15 allows all or some of the transmitted light wave 14 to be directed to the photodetector 16.

In FIG. 8B, a device has been shown in which the active optical components (light source 10, photodetector 16, and the servo circuit 41 and processing unit 42 are located remotely in a peripheral component 9, attached to the cover 8. The deformation-sensitive elements, i.e. the waveguide 20 and the membrane 2, are confined to a casing, formed from a carrier 7 closed by the cover. The cover 8 comprises transparent portions, so as to allow transmission of the emitted light wave 12 and of the transmitted light wave 14.

The invention will possibly be employed to form compact detecting devices, the main applications targeted being the detection of acoustic waves in the audible and ultrasonic domain.

The invention claimed is:

1. A device for detecting an acoustic wave, comprising:
   a membrane, carrying a waveguide, the membrane being configured to vibrate at a frequency of the acoustic wave;
   the waveguide comprising a first reflector, and a second reflector, each reflector reflecting light in a reflection spectral band, the waveguide being configured to vibrate with the membrane;
   the first reflector and the second reflector being spaced apart from each other, so as to form a resonant optical cavity, the resonant optical cavity defining a resonant wavelength, in the reflection spectral band;
   wherein the waveguide is configured to:
      transmit light at the resonant wavelength; and
      reflect light, in the reflection spectral band, not of the resonant wavelength;
   the device further comprising:
   a laser light source configured to emit a light wave at an emission wavelength, into the waveguide;
   a photodetector arranged to detect a light wave transmitted by the waveguide at the resonant wavelength;
   a servo circuit, connected to the light source and to the photodetector, and configured to servo-control the wavelength of the emission wave to the resonant wavelength of the resonant optical cavity at various times; and
   a processing unit connected to the servo circuit and configured to:
      determine a periodic time-dependent variation having a frequency corresponding to the frequency of the acoustic wave in the emission wavelength under the effect of a vibration of the membrane, the periodic time-dependent variation in the emission wavelength corresponding to a periodic variation in the resonant wavelength; and
      estimate an amplitude of the acoustic wave on the basis of the periodic time-dependent variation in the emission wavelength;
   wherein:
   the waveguide is formed directly on the membrane;
   the membrane exhibits, under the effect of the vibration, at least one vibration antinode, an amplitude of vibration being maximum at each vibration antinode;
   the waveguide lies level with at least one vibration antinode; and
   the first reflector and the second reflector are configured to deform under the effect of the vibration of the membrane.

2. The device as claimed in claim 1, wherein each reflector is a Bragg mirror, formed by a periodic modulation of a refractive index along the waveguide.

3. The device as claimed in claim 1, wherein the servo circuit comprises a servo loop, connected to the light source, and configured to servo-control the emission wavelength of the light wave emitted by the light source to the resonant wavelength of the resonant optical cavity.

4. The device as claimed in claim 3, wherein the servo circuit implements a top-of-fringe locking servo technique.

5. The device as claimed in claim 1, wherein the laser light source emits the light wave in an emission spectral band of width smaller than 10 pm.

6. The device as claimed in claim 1, wherein:
   the first reflector is a first Bragg mirror;
   the second reflector is a second Bragg mirror; and
   the first Bragg mirror and the second Bragg mirror form a same Bragg mirror comprising a defect, the first Bragg mirror and the second Bragg mirror corresponding to portions of the same Bragg mirror lying on either side of the defect, respectively.

7. A method for detecting an amplitude of an acoustic wave using a device as claimed in claim 1, comprising:
   vibrating the membrane, under an effect of the acoustic wave, the membrane vibrating at a vibration frequency corresponding to a frequency of the acoustic wave, the vibration of the membrane causing a vibration of the waveguide, under an effect of which vibrating the resonant wavelength of the waveguide is periodically modulated;
   activating the laser light source, such that the light source emits a light wave, at an emission wavelength, into the waveguide;
   using the servo circuit, servo-controlling the emission wavelength to the resonant wavelength, such that the emission wavelength varies periodically, the time-dependent variation in the emission wavelength corresponding to a periodic modulation of the resonant wavelength, at the frequency of the acoustic wave; and
   on a basis of the time-dependent variation in the emission wavelength, which variation is obtained via the servo circuit, estimating, using the processing unit, an amplitude of the acoustic wave.

8. A process for manufacturing a device as claimed in claim 1, comprising:
   depositing a thin layer of a first material on the membrane, so as to form the waveguide; and
   inscribing the waveguide with a femtosecond laser beam, so as to obtain a periodic modulation of a refractive index of the waveguide.

* * * * *